United States Patent
Austrheim et al.

(10) Patent No.: US 12,474,108 B2
(45) Date of Patent: Nov. 18, 2025

(54) SYSTEM AND METHOD OF TEMPERATURE CONTROL IN AN AUTOMATED GRID BASED STORAGE AND RETRIEVAL SYSTEM

(71) Applicant: Autostore Technology AS, Nedre Vats (NO)

(72) Inventors: Trond Austrheim, Etne (NO); Ivar Fjeldheim, Haugesund (NO)

(73) Assignee: AutoStore Technology AS, Nedre Vats (NO)

( * ) Notice: Subject to any disclaimer, the term of this patent is extended or adjusted under 35 U.S.C. 154(b) by 0 days.

(21) Appl. No.: 18/043,466

(22) PCT Filed: Sep. 1, 2021

(86) PCT No.: PCT/EP2021/074166
§ 371 (c)(1),
(2) Date: Feb. 28, 2023

(87) PCT Pub. No.: WO2022/053373
PCT Pub. Date: Mar. 17, 2022

(65) Prior Publication Data
US 2023/0314059 A1    Oct. 5, 2023

(30) Foreign Application Priority Data

Sep. 11, 2020  (NO) .................................. 20200997
Mar. 1, 2021   (NO) .................................. 20210275
Apr. 28, 2021  (NO) .................................. 20210519

(51) Int. Cl.
*F25D 17/06*     (2006.01)
*B65G 1/04*      (2006.01)
*F25D 13/04*     (2006.01)

(52) U.S. Cl.
CPC .......... *F25D 17/06* (2013.01); *B65G 1/0478* (2013.01); *F25D 13/04* (2013.01)

(58) Field of Classification Search
CPC .......... F25D 13/04; F25D 17/06; F25D 25/04; F25D 2317/0651; F25D 2317/0665;
(Continued)

(56) References Cited

U.S. PATENT DOCUMENTS 4,063,432 A    12/1977  Chaussy et al.
5,706,662 A     1/1998  Van
(Continued)

FOREIGN PATENT DOCUMENTS

CN    208 998 407 U    6/2019
DE    100 11 205 A1    9/2001
(Continued)

OTHER PUBLICATIONS

Search Report issued in counterpart Norwegian Application No. 20200997 mailed on Apr. 9, 2021 (2 pages).
(Continued)

*Primary Examiner* — Joseph F Trpisovsky
(74) *Attorney, Agent, or Firm* — Baker Botts L.L.P.

(57) ABSTRACT

An automated grid based storage and retrieval system includes a framework structure including upright members and a grid of horizontal rails provided at upper ends of the upright members. The framework structure defines at least one storage volume below the horizontal rails. The at least one storage volume is open against the horizontal rails such that storage container vehicles may lower and raise storage containers into and out of the storage volume. The at least one storage volume includes a plurality of storage columns arranged adjacent one another, a plurality of walls surrounding the at least one storage volume; a void extending beneath the storage columns; and a cooler system adapted to draw air
(Continued)

from the void, cool the air, and release the cooled air into an air release area arranged below the horizontal rails. The cooler system is arranged within an cooler enclosure arranged inside the plurality of walls and adjacent the plurality of storage columns. The cooler enclosure includes at least one opening from the void for the cooler system to draw air from the void, and a conduit for releasing the cooled air in the air release area.

7 Claims, 8 Drawing Sheets

(58) Field of Classification Search
CPC . B65G 1/0464; B65G 1/0478; F25B 2600/11; F25B 2600/112
See application file for complete search history.

(56) References Cited

U.S. PATENT DOCUMENTS

| | | | |
|---|---|---|---|
| 6,478,669 | B1 | 11/2002 | Van |
| 2008/0178616 | A1 | 7/2008 | Klysen |
| 2011/0107784 | A1 | 5/2011 | Tippmann et al. |
| 2014/0273793 | A1 | 9/2014 | Tippmann |
| 2014/0273801 | A1 | 9/2014 | Tippmann |
| 2018/0128532 | A1 | 5/2018 | Hognaland |
| 2018/0170650 | A1* | 6/2018 | Lindbo .................. F25D 13/02 |
| 2018/0209716 | A1* | 7/2018 | Jain ....................... F25D 31/007 |
| 2019/0032987 | A1* | 1/2019 | Tippmann .............. F25D 17/005 |
| 2019/0045817 | A1* | 2/2019 | Woolf .................... F25D 17/08 |

FOREIGN PATENT DOCUMENTS

| | | |
|---|---|---|
| JP | 2012153483 A | 8/2012 |
| NO | 317366 B1 | 10/2004 |
| WO | 0075041 A1 | 12/2000 |
| WO | 2011/047710 A1 | 4/2011 |
| WO | 2014/075937 A1 | 5/2014 |
| WO | 2014/090684 A1 | 6/2014 |
| WO | 2015/124610 A1 | 8/2015 |
| WO | 2015/193278 A1 | 12/2015 |
| WO | 2016/193418 A1 | 12/2016 |
| WO | 2016/193419 A1 | 12/2016 |
| WO | 2018/146304 A1 | 8/2018 |
| WO | 2019/206487 A1 | 10/2019 |

OTHER PUBLICATIONS

Search Report issued in counterpart Norwegian Application No. 20210275 mailed on Aug. 25, 2021 (2 pages).
Search Report issued in counterpart Norwegian Application No. 20210519 mailed on Nov. 23, 2021 (2 pages).
Written Opinion issued in corresponding International Application No. PCT/EP2021/074166, mailed on Jan. 4, 2022 (10 pages).
International Search Report issued in corresponding International Application No. PCT/EP2021/074166, mailed on Apr. 1, 2022 (4 pages).
Written Opinion issued in corresponding International Application No. PCT/EP2021/074166, mailed on Aug. 9, 2022 (5 pages).
International Preliminary Report on Patentability issued in corresponding International Application No. PCT/EP2021/074166, mailed on Nov. 29, 2022 (13 pages).

* cited by examiner

SYSTEM AND METHOD OF TEMPERATURE CONTROL IN AN AUTOMATED GRID BASED STORAGE AND RETRIEVAL SYSTEM

The present invention relates to an automated storage and retrieval system for storage and retrieval of containers, in particular to a system and method of ventilating the automated storage and retrieval system.

BACKGROUND AND PRIOR ART

Figure 1:
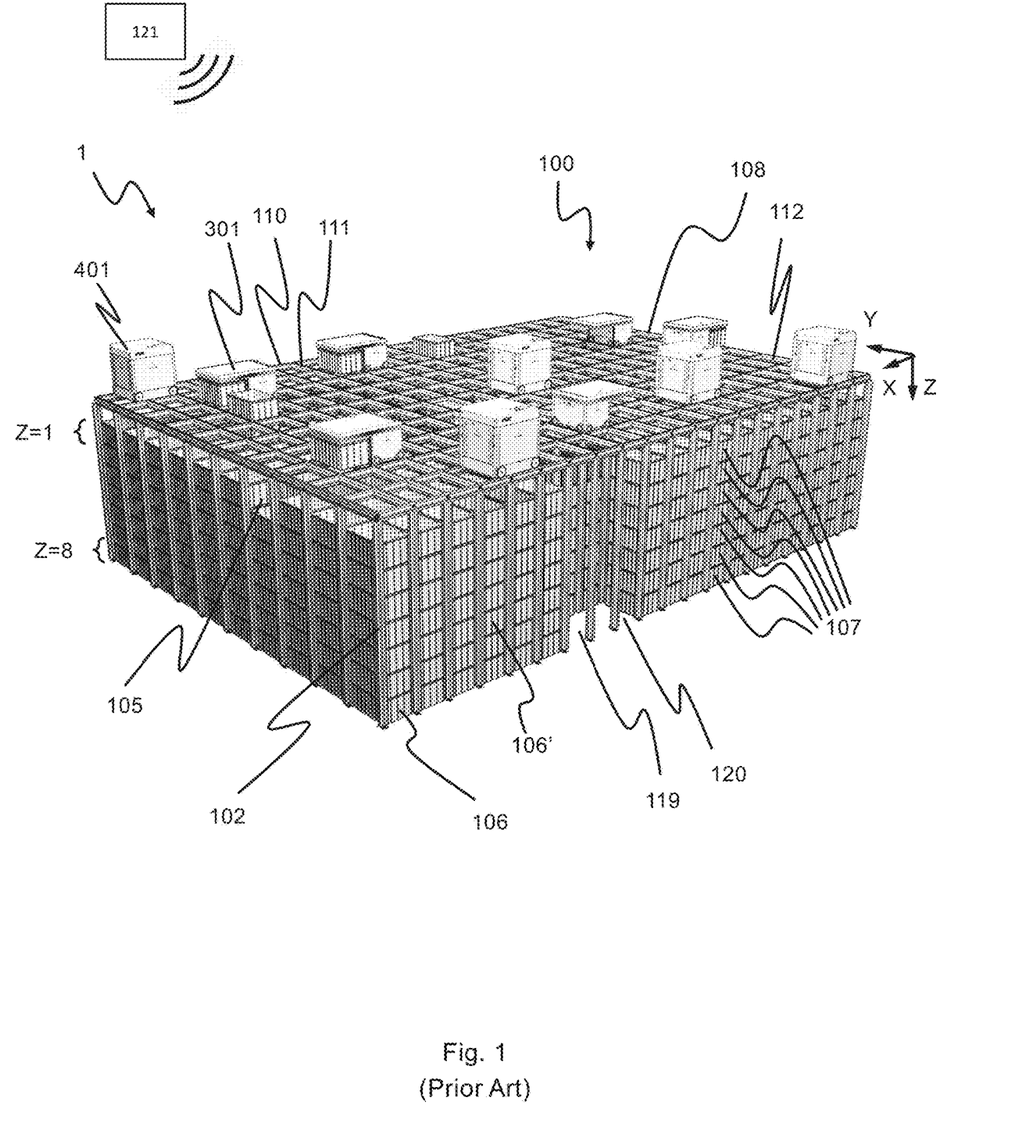
FIG. 1 is a perspective view of a framework structure of an automated storage and retrieval system.
Figure 2:
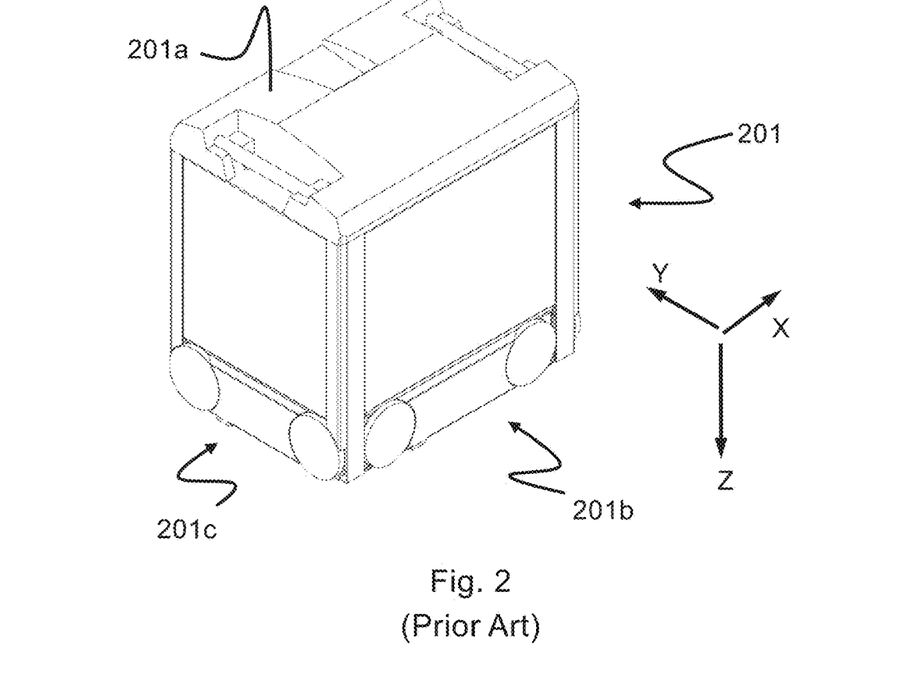
FIG. 2 is a perspective view of a prior art container handling vehicle having an internally arranged cavity for carrying storage containers therein.
Figure 3:
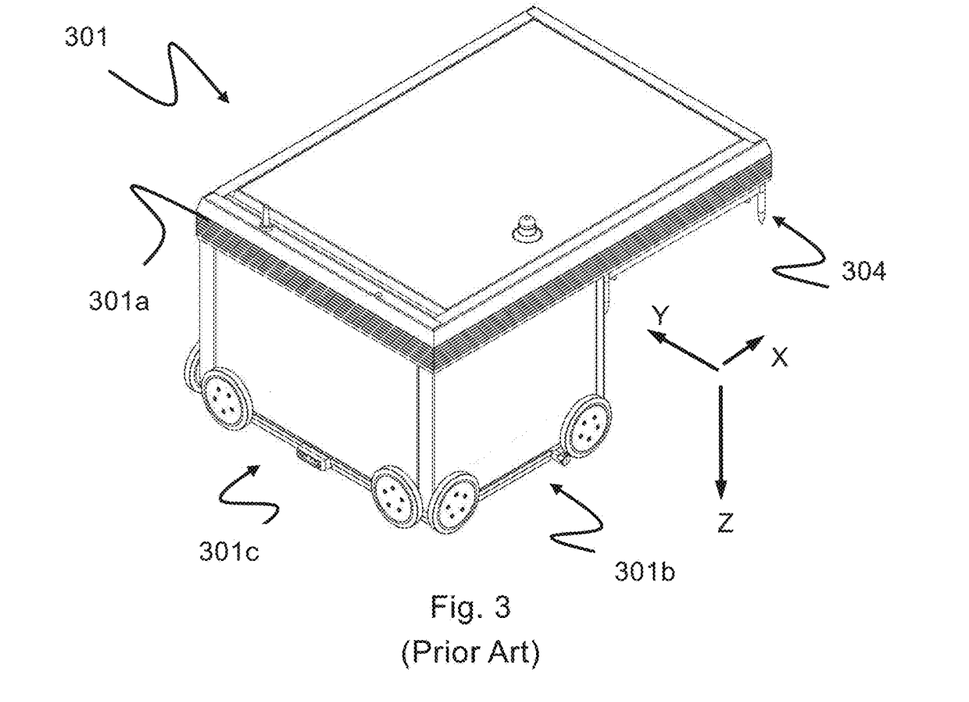
FIG. 3 is a perspective view of a prior art container handling vehicle having a cantilever for carrying storage containers underneath.
Figure 4:
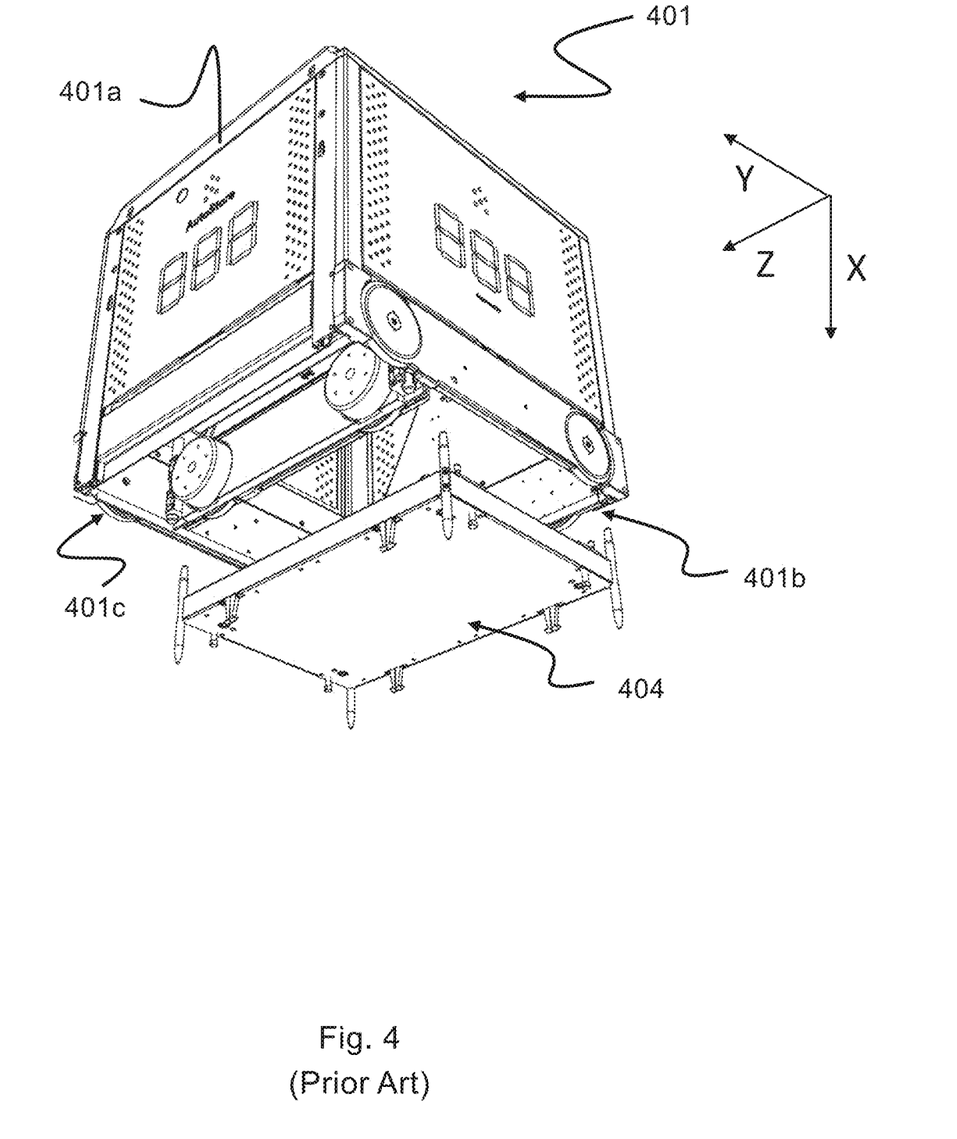
FIG. 4 is a perspective view of a prior art container handling vehicle having a lifting device for carrying storage containers in an internally arranged cavity.

FIG. 1 discloses a typical prior art automated storage and retrieval system 1 with a framework structure 100 and FIGS. 2, 3 and 4 disclose three different prior art container handling vehicles 201,301,401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301,401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301,401 in a first direction X across the top of the frame structure 100, and a second set of parallel rails 111 arranged perpendicular to the first set of rails 110 to guide movement of the container handling vehicles 201,301,401 in a second direction Y which is perpendicular to the first direction X. Containers 106 stored in the columns 105 are accessed by the container handling vehicles 201,301,401 through access openings 112 in the rail system 108. The container handling vehicles 201,301,401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301,401 comprises a vehicle body 201a,301a,401a and first and second sets of wheels 201b,301b,201c,301c,401b,401c which enable the lateral movement of the container handling vehicles 201,301,401 in the X direction and in the Y direction, respectively. In FIGS. 2, 3 and 4 two wheels in each set are fully visible. The first set of wheels 201b,301b, 401b is arranged to engage with two adjacent rails of the first set 110 of rails, and the second set of wheels 201c,301c,401c is arranged to engage with two adjacent rails of the second set 111 of rails. At least one of the sets of wheels 201b, 301b,201c,301c,401b,401c can be lifted and lowered, so that the first set of wheels 201b,301b,401b and/or the second set of wheels 201c,301c,401c can be engaged with the respective set of rails 110, 111 at any one time.

Each prior art container handling vehicle 201,301,401 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301,401 so that the position of the gripping/engaging devices with respect to the vehicle 201,301,401 can be adjusted in a third direction Z which is orthogonal the first direction X and the second direction Y. Parts of the gripping device of the container handling vehicles 301,401 are shown in FIGS. 3 and 4 indicated with reference number 304,404. The gripping device of the container handling device 201 is located within the vehicle body 201a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=5. The container handling vehicles 201,301,401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301,401 comprises a storage compartment or space for receiving and stowing a storage container 106 when transporting the storage container 106 across the rail system 108. The storage space may comprise a cavity arranged internally within the vehicle body 201a as shown in FIGS. 2 and 4 and as described in e.g. WO2015/193278A1 and WO2019/206487A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may instead have a footprint which is larger than the lateral area defined by a storage column 105 as shown in FIGS. 1 and 4, e.g. as is disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing.

These grooves and upwardly protruding elements are collectively known as tracks. Each rail may comprise one track, or each rail may comprise two parallel tracks.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301,401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a drop-off port column where the container handling vehicles 201,301 can drop off storage containers 106 to be transported to an access or a transfer station, and the second port column 120 may be a dedicated pick-up port column where the container handling vehicles 201,301,401 can pick up storage containers 106 that have been transported from an access or a transfer station (not shown).

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301,401 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301,401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301,401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301,401 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301,401 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301,401 so that a desired storage container 106 can be delivered to the desired location at the desired time without the container handling vehicles 201,301,401 colliding with each other, the automated storage and retrieval system 1 comprises a control system 121 which typically is computerized and which typically comprises a database for keeping track of the storage containers 106.

Some of the above systems 1 may be used to store product items which require a certain environment. For example, some types of food require a cool temperature environment (typically temperatures between 1° C.-6° C.), some types of food require an even colder temperature environment (typically temperatures lower than −15° C.), and other types of food require a higher temperature environment (typically temperatures above 10° C.).

In buildings in which such storage systems are located, ventilation systems are typically used to provide the desired environment. However, with the space efficiency obtained by storing the containers in stacks adjacent to each other, less air is available in the storage area for the temperature control of the stored products.

WO2015/124610A1 discloses an automated storage and retrieval system, where the storage volume is subdivided into a number of sections separated from each other by thermal insulation. The sections may be cooled to different temperatures by connecting a cooling unit, such as an evaporator, to one of the sections. Insulating covers are arranged in the top level of the storage columns to provide a thermal barrier towards the container handling vehicle as well as contributing to maintaining the desired temperature in the storage containers in the storage columns.

A problem with the prior art solutions is that in order to remove a storage container from the storage column, the insulating covers has to be moved by a container handling vehicle to another position, or hold it temporarily while the storage container is removed from the storage column. The additional steps of removing and replacing insulating covers requires additional container handling vehicles, and the steps themselves introduces delays. Both factors contribute to slow down the system.

In view of the above it is desirable to provide an automated storage and retrieval system, and a method of operating such as system, that solves or at least mitigates one or more of the aforementioned problems related to use of prior art storage and retrieval systems.

SUMMARY OF THE INVENTION

The present invention is set forth and characterized in the independent claims, while the dependent claims describe other characteristics of the invention.

In one aspect, the invention is related to an automated grid based storage and retrieval system, comprising a framework structure comprising upright members and a grid of horizontal rails provided at upper ends of the upright members, the framework structure defining at least one storage volume below the horizontal rails. The at least one storage volume comprising a plurality of storage columns arranged adjacent one another, a plurality of walls surrounding the at least one storage volume, a void extending beneath the storage columns, and a cooler system adapted to draw air from the void, cool the air, and release the cooled air into an air release area arranged below the horizontal rails. The cooler system is arranged within an cooler enclosure arranged inside the plurality of walls and adjacent the plurality of storage columns, the cooler enclosure comprising at least one opening from the void for the cooler system to draw air from the void, and further comprising a conduit for releasing the cooled air in the air release area.

An advantage of the system is that the system creates a forced air flow that removes the need for lids/covers over the grid to isolate the cooled storage columns from the container handling vehicles on the horizontal rails. This reduces the time required to retrieve bins from the cooled storage columns as well as freeing container handling vehicles to retrieve bins rather than moving lids/covers around. An advantage of positioning the cooling system within the grid is that a plurality of cooled storage volume may be positioned on the grid and that each of the cooled storage volumes may be cooled to different temperatures.

In one embodiment, the conduit may be provided with a plurality of vents for releasing the cooled air in the air release area.

In one embodiment, the conduit may be arranged to extend alongside the storage volume.

In one embodiment, the conduit extended alongside the storage volume may be arranged as a single conduit loop around the storage volume.

In one embodiment, the air release area may be arranged adjacent the upper ends of the upright members.

In one embodiment, the one or more of the plurality of walls may comprise a thermal insulating material.

In one embodiment, the cooler system may comprise a chiller to cool the air, and a fan to draw the air from the void. The fan may be positioned between an outlet of the chiller and an inlet of the conduit.

In one embodiment, the system may be adapted to hold a storage volume temperature in the storage volume below 10° C., below 4° C., below 0° C., or below −20° C.

In one embodiment, the system may be provided with at least two storage volumes. A first of the at least two storage volumes may be set to hold the storage volume temperature lower than the storage volume temperature of the second of the at least two storage volumes.

In one embodiment, the system may further comprising a floor with a plurality of ventilation holes provided between the storage columns and the void beneath the storage columns, where a total area of each of the plurality of ventilation holes increases with the horizontal distance of the ventilation hole from the at least one opening in the enclosed volume.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1-4, i.e. a number of upright members 102, and further that the framework structure 100 comprises a first, upper rail system 108 in the X direction and Y direction.

The framework structure 100 further comprises storage compartments in the form of storage columns 105 provided between the members 102, where storage containers 106 are stackable in stacks 107 within the storage columns 105.

The framework structure 100 can be of any size. In particular, it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the automated storage and retrieval system according to the invention will now be discussed in more detail with reference to FIGS. 5-9.

Figure 5:
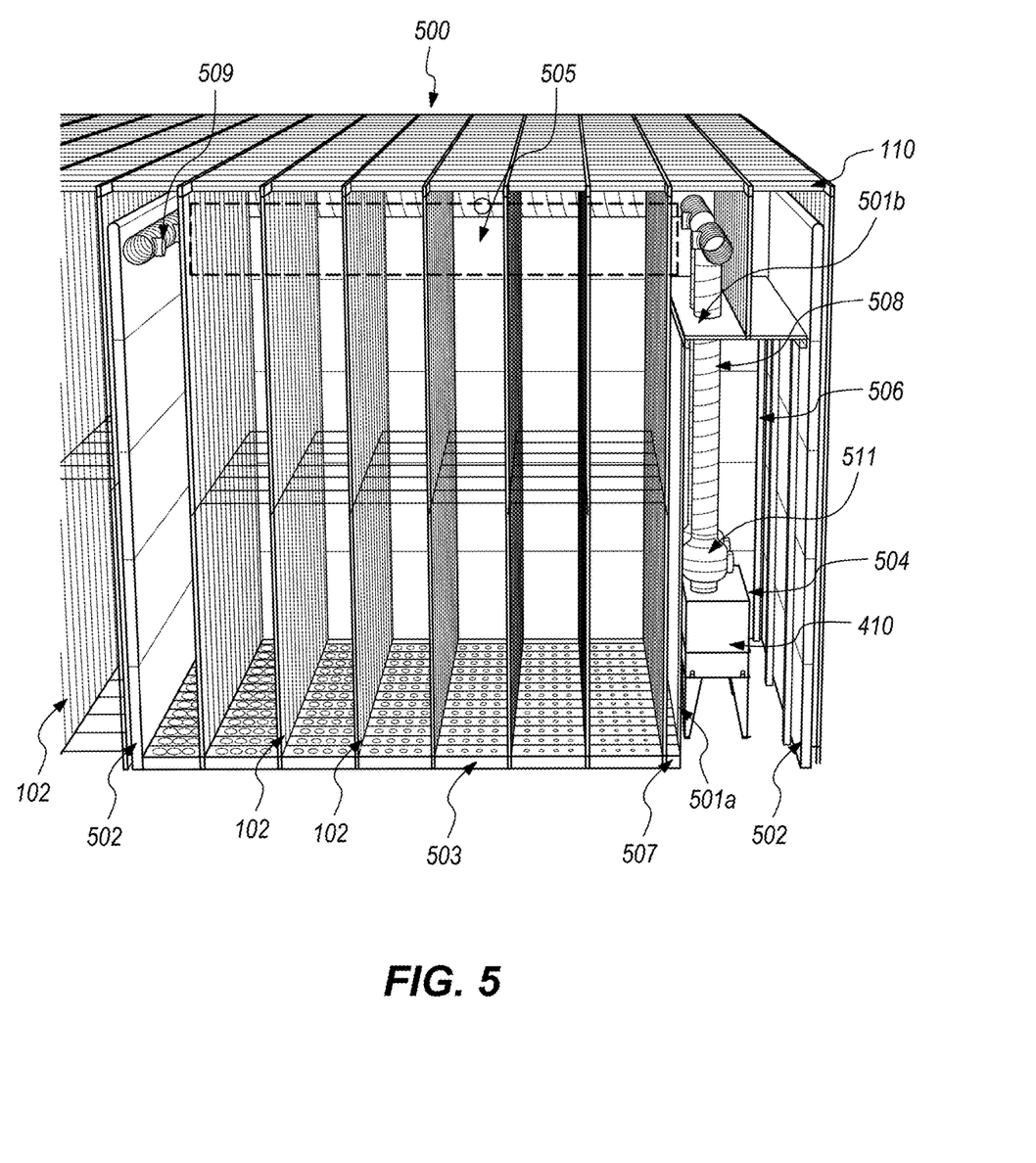
FIG. 5 is a perspective sideview of an exemplary automated storage and retrieval system according to an embodiment of the present invention.
Figure 6:
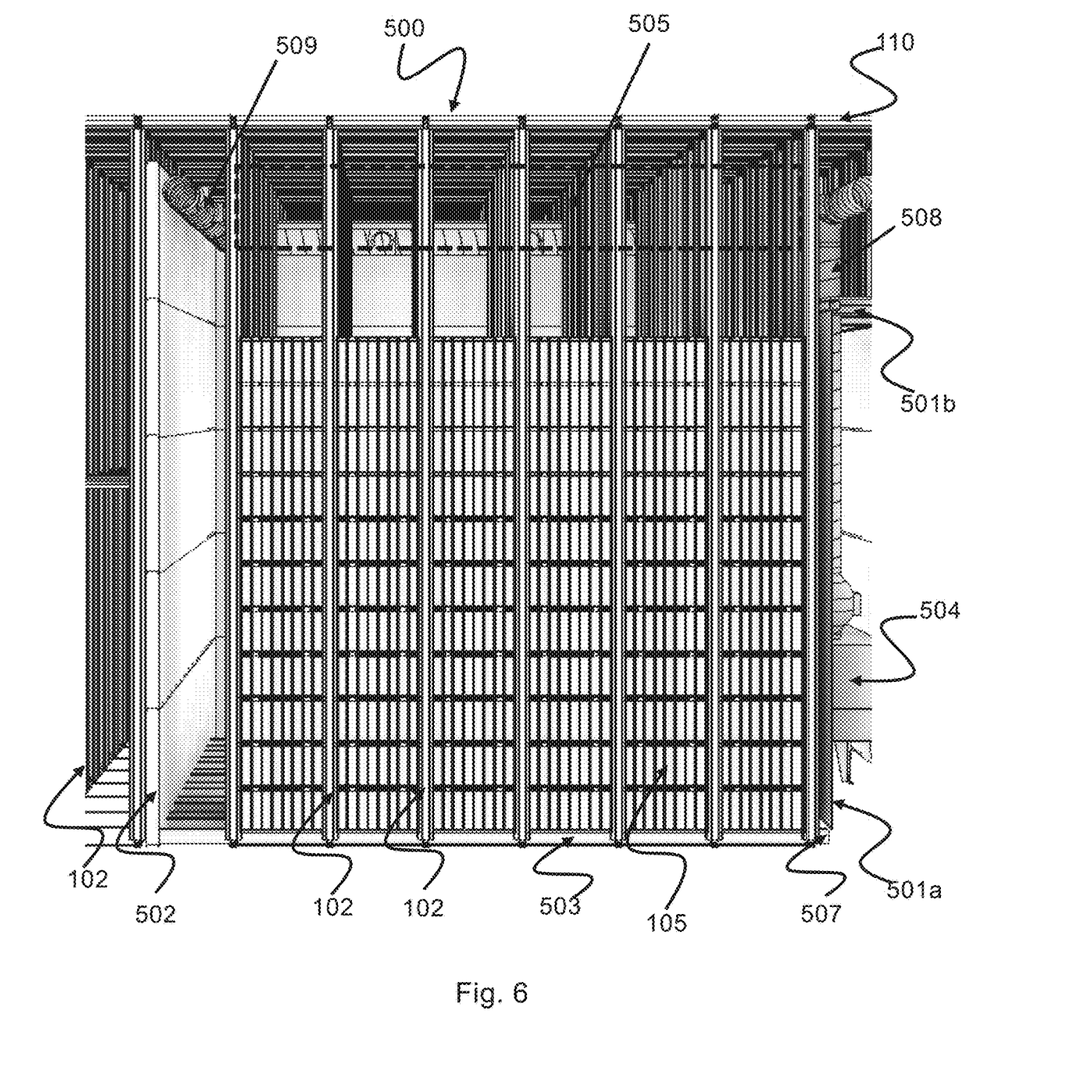
FIG. 6 is a side view of an exemplary automated storage and retrieval system according to an embodiment of the present invention.
Figure 7:
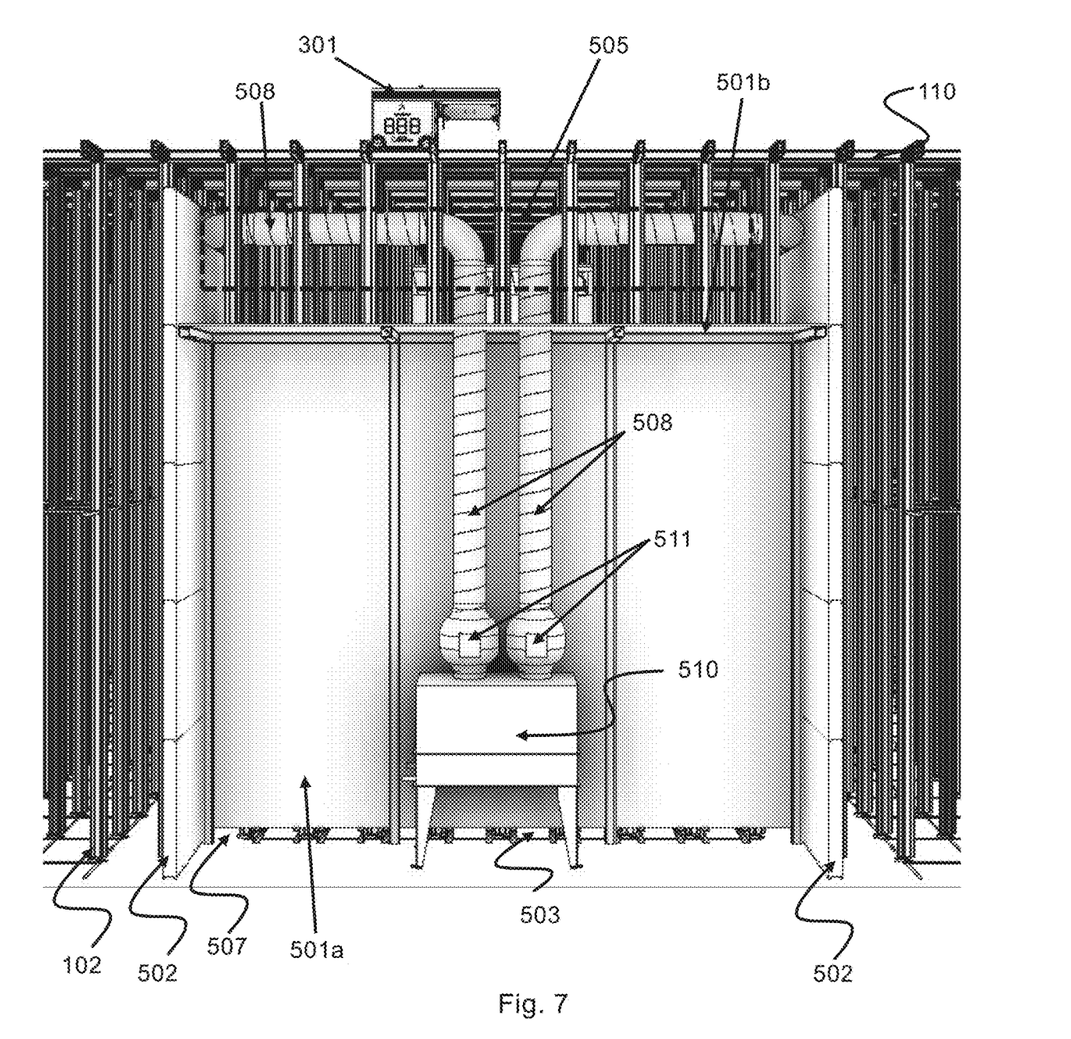
FIG. 7 is a side view of an exemplary automated storage and retrieval system according to an embodiment of the present invention.

FIG. 5 is a schematic illustration of an automated storage and retrieval system, comprising a framework structure 100. The framework structure 100 defining at least one storage volume 500 comprising a plurality of storage columns 105 arranged adjacent one another below the horizontal rails 110. Storage containers 106 are stacked on top of each other within each storage column. The framework structure 100 comprises a plurality of walls 502 surrounding the at least one storage volume 500 to separate the at least one storage volume 500 from external ambient conditions. The plurality of walls 502 surrounding the storage volumes provides substantially airtight channels extending from below the horizontal rails 110 to a void or voids 503 beneath the at least one storage volume 500. The at least one storage volume 500 is open against the horizontal rails 110 such that storage container vehicles 201, 301 may lower and raise storage containers 106 into and out of the storage volume.

The automated storage and retrieval system comprise a cooler system 504 adapted to draw air from the void 503, cool the air, and release the cooled air in an air release area 505 arranged below the horizontal rails 110. The air release area 505 is in one embodiment arranged adjacent the upper ends of the upright members 102. The cooler system 504 is arranged within a cooler enclosure 506 arranged inside the plurality of walls 502 and adjacent the plurality of storage columns 105. The horizontal rails 110 continues over the cooler enclosure 507, such that the presence of the cooler enclosure within the grid does not create a discontinuity of the horizontal rails. Container handling vehicles may move storage containers above the enclosure 507 to other sections of the automated storage and retrieval system, outside the at least one storage volume 500. The cooler enclosure 506 comprises an opening 507 from the void 503 for the cooler system 504 to draw air from the void 503. The cooler system 504 also comprises a conduit 508 for releasing the cooled air in the air release area 505. The cooler enclosure 506, may be separated from the storage columns 105 of the framework structure 100 by one or more vertically extending, internal dividers 501a. The at least one opening 507 to the void 503 is provided at the lower end of at least one of the one or more vertical extending, internal dividers 501a. The one or more vertical extending, internal dividers 501a and at least one of the plurality of walls 502 provides a substantially airtight channel extending from the opening or openings 507 to the upper end of the vertical extending, internal dividers 501a. The upper end of the vertically extending internal divider 501a may in one embodiment be adjacent the horizontal rails 110. In another embodiment, as illustrated in FIG. 5, the upper end of the vertically extending internal divider 501a may be adjacent the upper end of the storage columns 105, for example up to or exceeding the height of a normal full stack of storage containers (e.g., within one storage container height from a working surface level of the rails 110). The cooler enclosure may be open against the rails, or as illustrated in FIG. 5, the cooler enclosure 506 may also be separated by one or more horizontally extending internal dividers 501b arranged substantially in line with the upper end of the storage columns.

Figure 8:
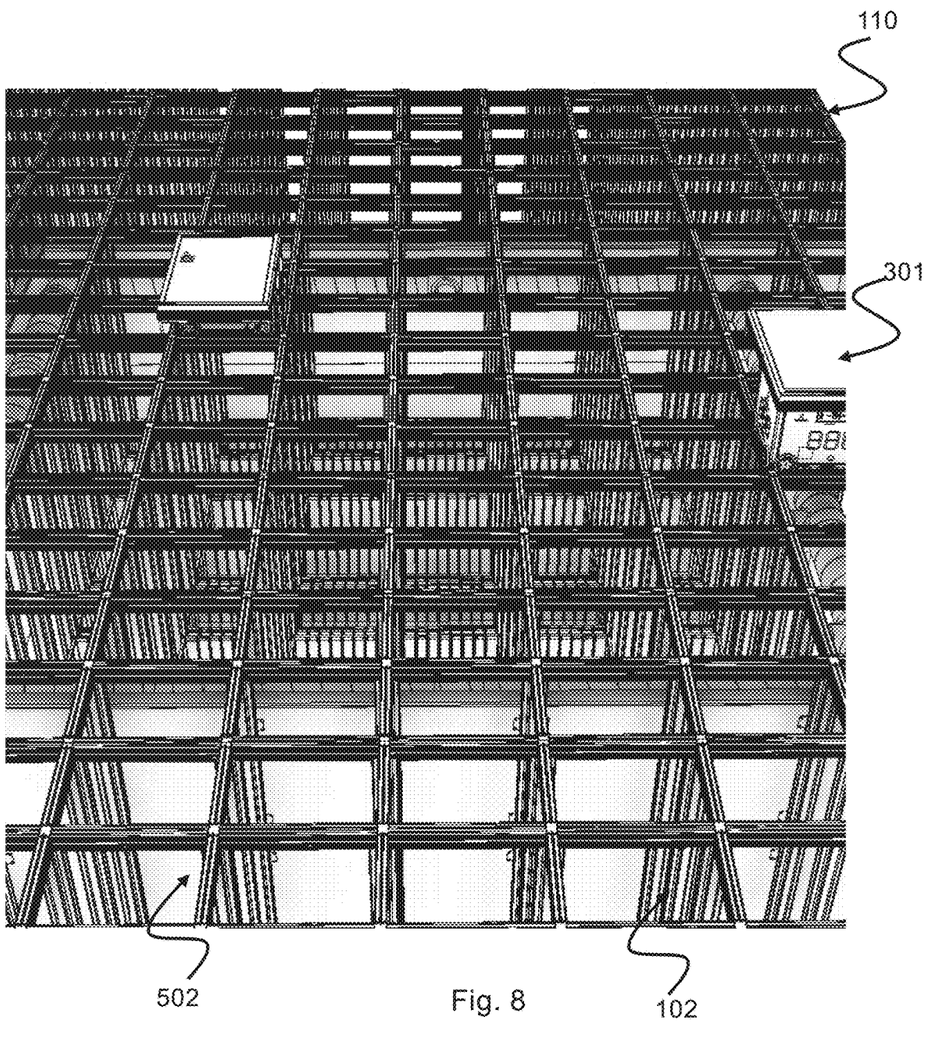
FIG. 8 is a perspective top view of an exemplary automated storage and retrieval system according to an embodiment of the present invention.
Figure 9:
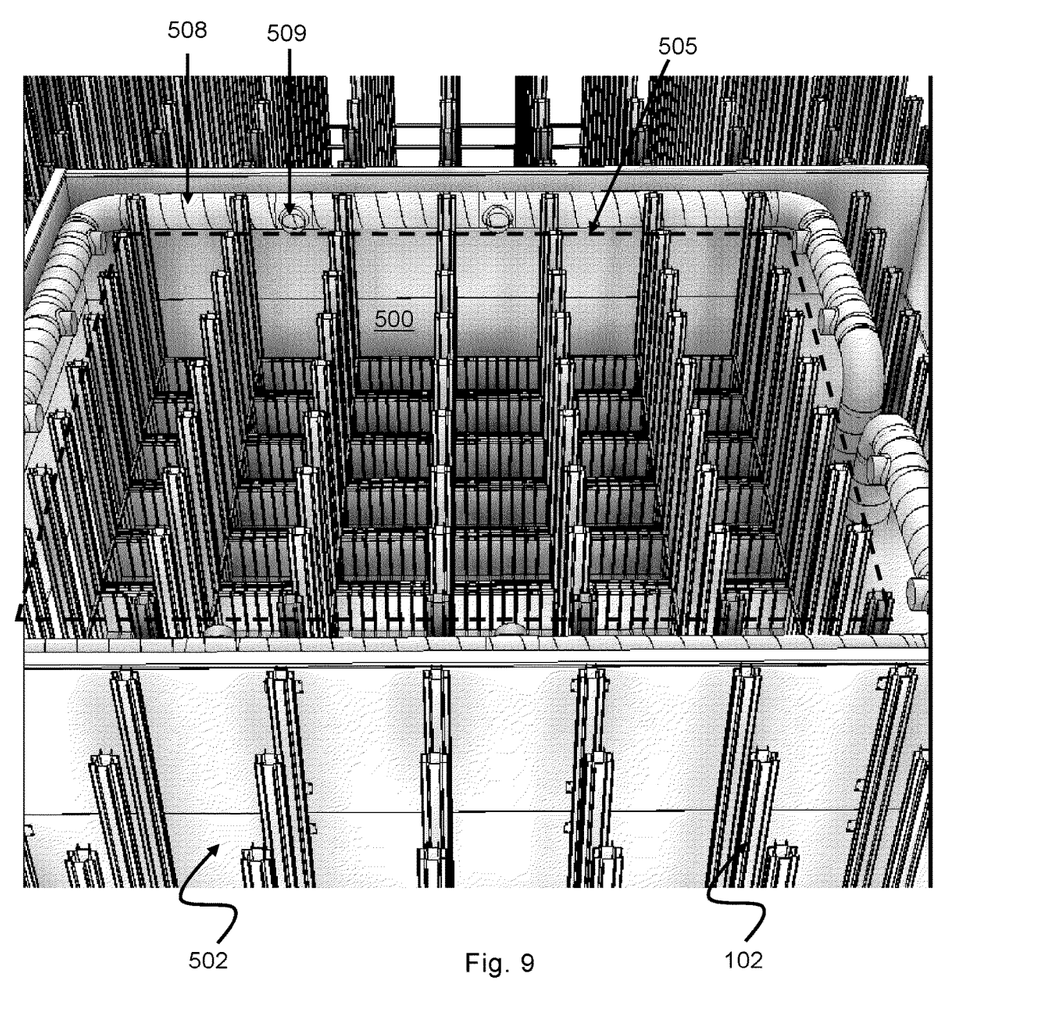
FIG. 9 shows a sectional view of the exemplary automated storage and retrieval system of FIG. 8 below a level of the horizontal rails and the container handling vehicles.

In one embodiment, as illustrated in FIG. 5, the conduit 508 is arranged to extend alongside the storage volume 500. One conduit may extend along one side or the storage volume, and another conduit may extend along another side of the storage volume 500. FIG. 8 illustrates a single conduit 508 looping around the storage volume 500.

The conduit 508 may be provided with a plurality of vents 509 for releasing the cooled air in the air release area 505. The cooled air may be released in an essential horizontal trajectory from the conduit, or in a trajectory below horizontal to avoid cooled air hitting the horizontal rails as cooled air may cause unwanted condensation on the horizontal rails.

The cooler system 504 may in one embodiment comprise a chiller 510 to cool the air, and a fan 511 to draw the air from the void 503. The chiller 510 may be for example be an evaporator or a heat exchanger. The chiller may be connected to an evaporator or heat exchanger external to the cooler enclosure 506 to dump heat outside the storage volume 500. However, any suitable cooler system may be used. The fan 511 may be positioned between an outlet of the chiller 510 and an inlet of the conduit 508.

When air is drawn from the void 503 through the cooler system 504 an underpressure, or vacuum, is created in the void 503. The magnitude of the underpressure in the void 503 is controlled by a force drawing air into the cooler system 504 and the airflow of released cooled air in the air release area 505.

When cooled air is released in the air release area 505 an overpressure is created in the air release area 505 above the at least one storage volume 500. The magnitude of the overpressure and the temperature in the air release area 505 is controlled by the temperature of the air leaving the cooler system 504, and the force blowing air into the air release area 505. The temperature in the air release area 505 may depend to an extent on the shape and/or volume of the air release area.

The system may further comprise a controller adapted for controlling the temperature in the at least one storage volumes 500 by adjusting the underpressure in the void 503 below the storage volume 500. The pressure differential between the overpressure in the air release area 505 and the underpressure in the void 503, determines the speed of air through the at least one storage volume 500. A higher pressure differential increases the speed of air and increases the cooling effect of the air passing through the storage volume 500. A lower pressure differential reduces the speed of air and reduces the cooling effect of the air passing through the storage volume 500.

The at least one storage volume 500 may comprise at least one temperature sensor, and the controller may be adapted to adjust airflow based on a temperature measured by the at least one temperature sensor. The temperature sensor may be positioned within the walls of the storage volume and outside the cooler enclosure 506.

The storage volumes 500 may hold a storage volume temperature suitable for fruit, vegetables, flowers, etc., e.g. 10° C., a storage volume temperature suitable for easily perishable food such as meat, fish, dairy produce, etc., e.g. 1-4° C., or hold a freezing temperature, i.e. below 0° C., typically −20° C. There may of course be more than one storage volume and each storage volume may have a different storage volume temperature. There may also be several storage volumes having similar storage volume temperatures.

One advantage of arranging the air release area 505 below the horizontal rails 110 is that the cold air entering the grid creates a "cold curtain", preventing air moving freely between the container handling vehicle environment and the storage volume environment. This prevents the container handling vehicle ambient temperature from being below 0° C., thus allowing the container handling vehicles to work within their normal temperature operating window.

Container handling vehicles 201 having a cavity arranged internally within the vehicle body needs spaces below the horizontal rails 110 to temporarily drop of non-target storage container during digging operations. This opens up a space between the horizontal rails 110 and the topmost storage container in the storage columns 105, that may receive the air release area 505.

In one embodiment, the plurality of walls 502 each comprise a thermal insulating material. A thermal insulating material is a material that has a lower thermal conductivity than general purpose construction materials, such as aluminium, acrylic glass, plywood, plaster and timber. Thermal insulating materials typically have a thermal conductivity below 0.06 $Wm^{-1}K^{-1}$. Exemplary thermal insulating material includes, but are not limited to, glass wool, cellulose, rock wool, polystyrene foam, urethane foam, vermiculite, perlite, and cork. The wall may be made of a thermal insulating material, the wall may be covered by an insulating material, or the thermal insulating material may be part of a sandwich wall construction. Walls 502 comprising a thermal insulating material is particularly useful when the difference in storage volume temperatures between two neighboring storage volumes is too high to control by airflow only. The inner dividers 501a, 501b is inside the walls 502 and would usually not require thermal insulating material. The inner divers 501a, 501b may therefore be thinner than the vertical wall 502.

The system may further comprise a floor with a plurality of ventilation holes provided between the storage volume 500 and the void 503 beneath the storage volume 500, where a total area of each of the plurality of ventilation holes increases with the horizontal distance of the ventilation hole from the at least one opening 507 in the cooler enclosure 506. The total area of each of the plurality of ventilation holes may be varied by the number and/or size of ventilation holes. Small and/or few ventilation holes close to the air outlet and larger and/or more ventilation holes further away from the air outlet will create a more uniform airflow and more uniform cooling within each storage volume. The total area of each of the plurality of ventilation holes may be adjustable, e.g. using an aperture plate over another aperture plate where the two aperture plates are moved relative to each other. The plurality of ventilation holes may be provided by a plurality of perforations in panels forming the floor arranged between the storage volume 500 and the void 503 at a lower end of the storage volume 500.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Prior art automated storage and retrieval system
100 Framework structure
102 Upright members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
121 Control system
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)
304 Gripping device
401 Prior art storage container vehicle
401a Vehicle body of the storage container vehicle 401
401b Drive means/wheel arrangement, first direction (X)
401c Drive means/wheel arrangement, second direction (Y)
X First direction
Y Second direction
Z Third direction
500 Storage volume
501a Inner vertical divider
501b Inner horizontal divider
502 Vertical wall
503 Void
504 Cooler system
505 Air release area
506 Cooler enclosure
507 Opening
508 Conduit
509 Vent
510 Chiller
511 Fan

The invention claimed is:

1. An automated grid based storage and retrieval system, comprising:
    a framework structure comprising upright members and a grid of horizontal rails provided at upper ends of the upright members, the framework structure defining at least one storage volume below the horizontal rails, the at least one storage volume is open against the horizontal rails such that storage container vehicles may lower and raise storage containers into and out of the at least one storage volume, the at least one storage volume comprising:

a plurality of storage columns arranged adjacent one another, a plurality of walls surrounding the at least one storage volume;

a void extending beneath the storage columns; and a cooler system adapted to draw air from the void, cool the air, and release the cooled air into an air release area arranged below the horizontal rails, wherein the cooler system is arranged within a cooler enclosure arranged inside the plurality of walls and adjacent the plurality of storage columns, the cooler enclosure comprising at least one opening from the void for the cooler system to draw air from the void, and further comprising a conduit for releasing the cooled air in the air release area, a controller for controlling a temperature in the at least one storage volume, said controller being configured to instruct the cooler system to adjust an air pressure in the void such that an air pressure differential between the air release area and the void is increased or lowered whereby a cooling effect of the air passing through the storage volume is increased or lowered, and a floor between the storage columns and the void beneath the storage columns, the floor comprising a plurality of ventilation holes, wherein each particular ventilation hole among the plurality of ventilation holes has an area that increases with a horizontal distance of the particular ventilation hole from the at least one opening in the cooler enclosure;

wherein the conduit is arranged to extend alongside the at least one storage volume and the conduit extended alongside the storage volume is arranged as a single conduit loop around the at least one storage volume, and wherein the cooler system comprises a chiller to cool the air and a fan to draw the air from the void and the fan is positioned between an outlet of the chiller and an inlet of the conduit.

2. The system according to claim 1, wherein the conduit is provided with a plurality of vents for releasing the cooled air in the air release area.

3. The system according to claim 1, wherein the air release area is arranged adjacent the upper ends of the upright members.

4. The system according to claim 1, wherein one or more of the plurality of walls comprises a thermal insulating material.

5. The system according to claim 1, wherein the system is adapted to hold a storage volume temperature in the at least one storage volume below 10° C., below 4° C., below 0° C., or below −20° C.

6. The system according to claim 1, wherein the system is provided with at least two storage volumes.

7. The system according to claim 6, wherein a first of the at least two storage volumes is set to hold the storage volume temperature lower than the storage volume temperature of a second of the at least two storage volumes.

* * * * *